United States Patent
Gong et al.

(10) Patent No.: US 8,534,777 B2
(45) Date of Patent: Sep. 17, 2013

(54) SUPPORTING DEVICE FOR FIXING ELECTRONIC ELEMENTS ON COMPUTER HOUSING

(75) Inventors: Xin-Hu Gong, Shenzhen (CN); Ju-Wen Dai, Shenzhen (CN); Si-Wen Shu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 43 days.

(21) Appl. No.: 13/418,360

(22) Filed: Mar. 13, 2012

(65) Prior Publication Data
US 2012/0242203 A1    Sep. 27, 2012

(30) Foreign Application Priority Data
Mar. 23, 2011    (CN) .......................... 2011 1 0069945

(51) Int. Cl.
*H05K 5/00* (2006.01)

(52) U.S. Cl.
USPC ................................. 312/223.2; 361/679.33

(58) Field of Classification Search
USPC ............. 312/223.2, 223.1, 325, 319.1, 319.2; 361/679.33–679.39; 292/194, 219, 220, 292/1, DIG. 4
See application file for complete search history.

(56) References Cited

U.S. PATENT DOCUMENTS

| 7,440,271 | B2 * | 10/2008 | Chen et al. | 361/679.33 |
| 7,697,279 | B2 * | 4/2010 | Yeh et al. | 361/679.39 |
| 8,054,621 | B2 * | 11/2011 | Chang | 361/679.37 |
| 8,096,627 | B2 * | 1/2012 | Lin | 312/325 |
| 8,379,380 | B2 * | 2/2013 | Zhang | 361/679.33 |
| 8,462,518 | B2 * | 6/2013 | Marroquin et al. | 361/807 |
| 2013/0070415 | A1 * | 3/2013 | Terry | 361/679.38 |

* cited by examiner

*Primary Examiner* — Janet M Wilkens
*Assistant Examiner* — Daniel Rohrhoff
(74) *Attorney, Agent, or Firm* — Altis Law Group, Inc.

(57) ABSTRACT

A supporting device includes a loading device and a locking device. The loading device has a sidewall defining a curved first sliding slot, a second sliding slot and a fixing hole. The locking device is positioned on the sidewall, and includes a connecting pole, a swing pole, a buckle, a first and a second bolts, and a shaft. The connecting pole is positioned on an outer surface of the sidewall and defines a third sliding slot. The swing pole is attached on an inner surface of the sidewall and defines a first and a second through holes. The buckle is attached on the swing pole and defines a third through hole. The first bolt extends through the first and third through holes, and the first and third sliding slots. The second bolt extends through the second sliding slot. The shaft extends through the second through hole and the fixing hole.

20 Claims, 8 Drawing Sheets

SUPPORTING DEVICE FOR FIXING ELECTRONIC ELEMENTS ON COMPUTER HOUSING

BACKGROUND

1. Technical Field

The present disclosure relates to supporting devices and, particularly, to a supporting device used in a computer.

2. Description of Related Art

A number of electronic elements (such as hard disks and memories) are received in a computer housing and secured in place by means of a number of supporting devices. The supporting devices are usually fixed in the computer by soldering or screwing. If users want to disassemble the electronic elements from the computes, they must first open the housing (i.e. remove plates or covers from the housing). This is very inconvenient.

Therefore, it is desirable to provide a supporting device that can overcome the above-mentioned limitations.

BRIEF DESCRIPTION OF THE DRAWINGS

Many aspects of the embodiments are better understood with reference to the drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
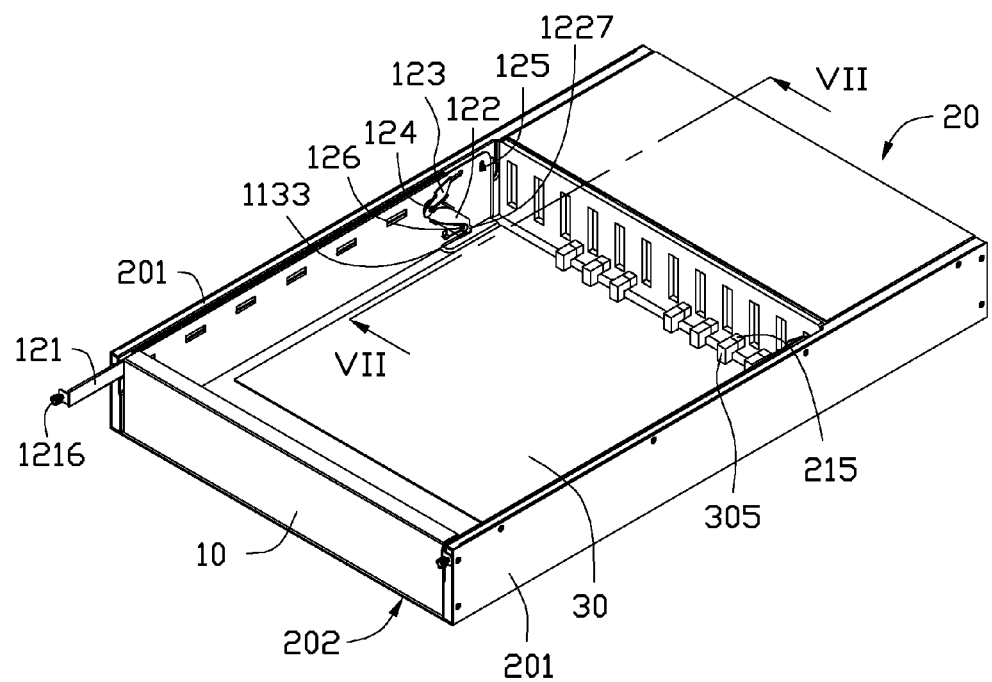
FIG. 1 is a schematic view of a supporting device, according to an exemplary embodiment, showing the supporting device assembled in a computer without a top plate.
Figure 2:
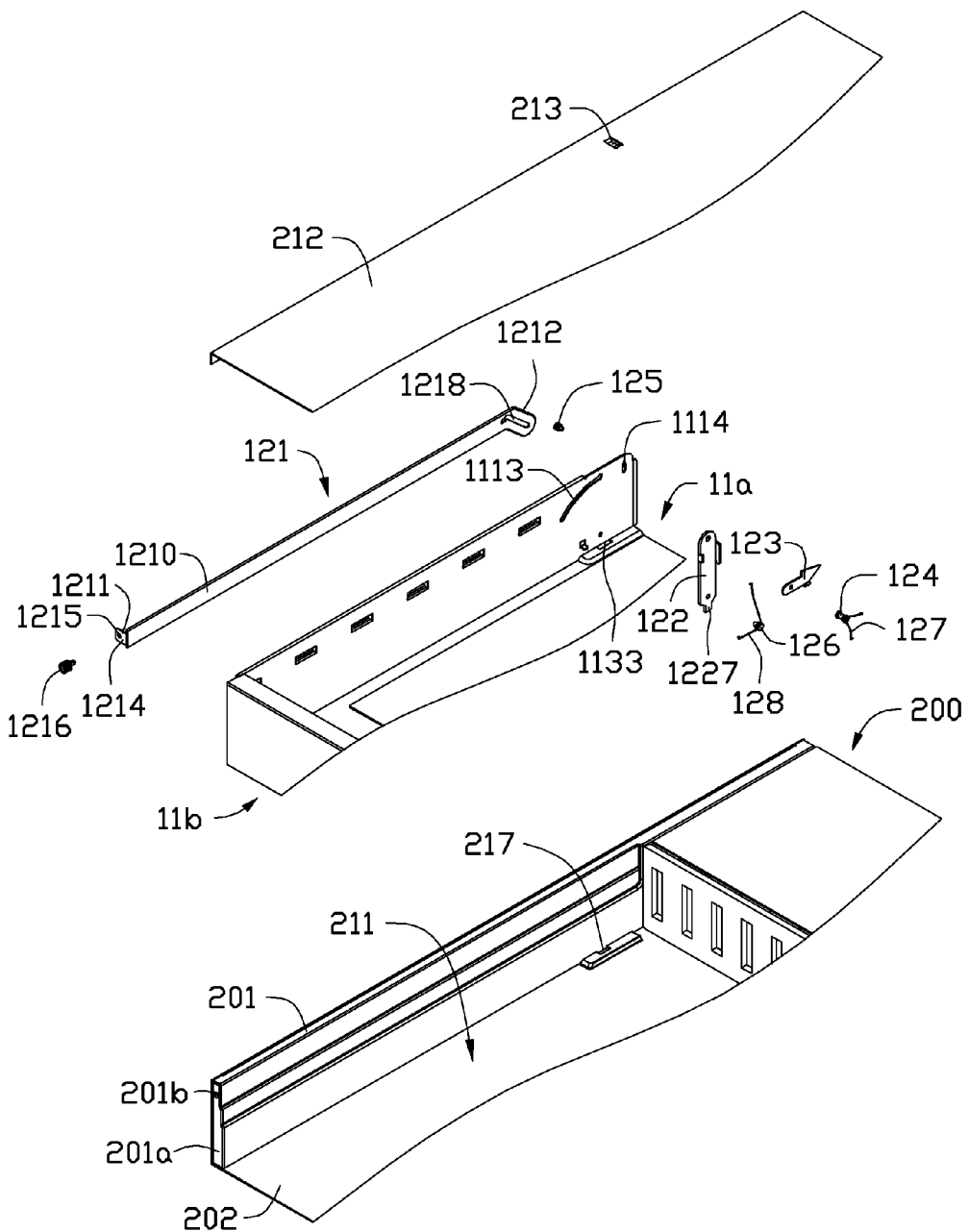
FIG. 2 is a schematic, exploded view of the supporting device, and the computer of FIG. 1.

Referring to FIGS. 1 & 2, a supporting device 10, according to an embodiment, is used in a computer 20. The computer 20 includes a housing 200 and an electronic element 30 (such as a hard disk drive or a memory element) received in the housing 200. The supporting device 10 is received in the housing 200 and is used for supporting the electronic element 30, and thus securely fixing the electronic element 30 in the housing 200.

The housing 200 includes two parallel side plates 201, a bottom plate 202 connected between the two side plates 201, a top plate 212 opposite to the bottom plate 202, and two locating blocks 213. The two locating blocks 213 (see FIG. 7) are positioned on a surface of the top plate 212 facing the bottom plate 202. The bottom plate 202 defines two recesses 217 respectively adjacent to the two side plates 201. A number of input interfaces 215 are received in the housing 200.

The electronic element 30 has a number of output interfaces 305 which may be electrically connected to the input interfaces 215.

Figure 3:
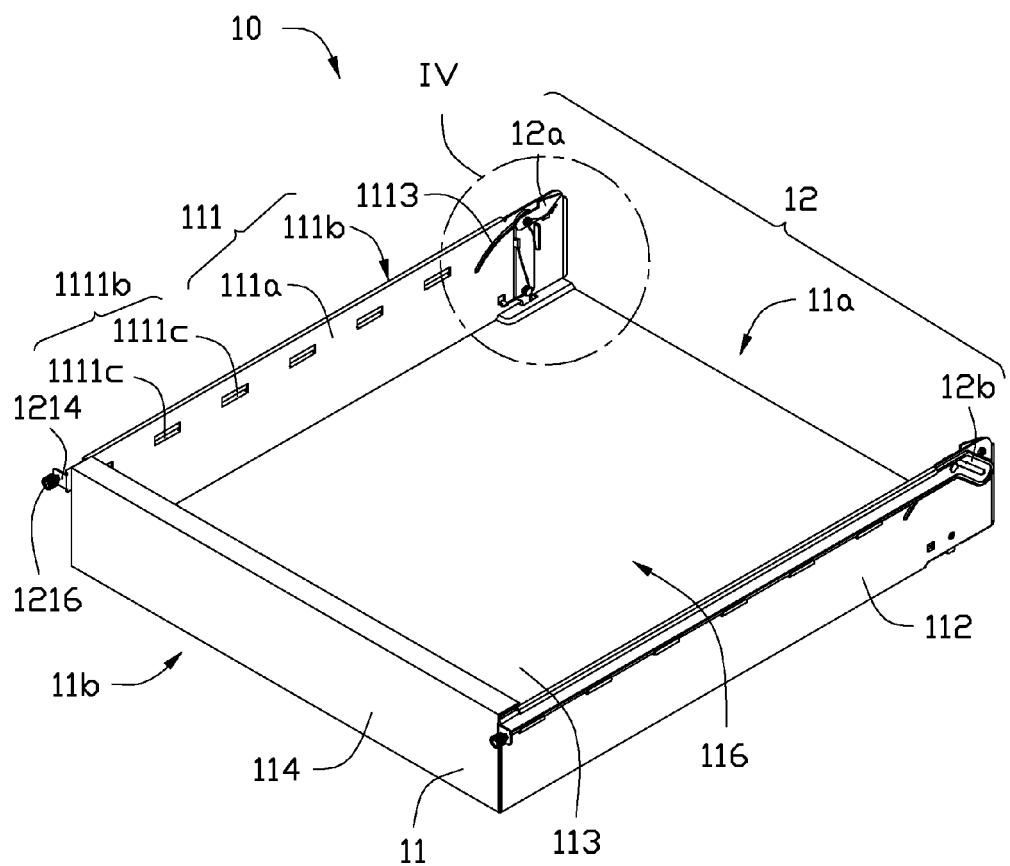
FIG. 3 is a schematic view of the supporting device of FIG. 1.

Referring to FIG. 3, the supporting device 10 includes a loading device 11 and a locking device 12. The locking device 12 includes a first locking device 12a, and a second locking device 12b. The configuration of the first locking device 12a is the same as the configuration of the second locking device 12b.

The loading device 11 is used for loading the electronic element 30, and has a first sidewall 111, a second sidewall 112 opposite to the first sidewall 111, a bottom wall 113, and a rear wall 114 perpendicular to the bottom wall 113. Both the bottom wall 113 and the rear wall 114 are connected between the first sidewall 111 and the second sidewall 112. The first sidewall 111, the second sidewall 112, the bottom wall 113, and the rear wall 114 cooperatively define a receiving groove 116 for receiving the electronic element 30. The configuration of the second sidewall 112 is the same as the configuration of the first sidewall 111.

Figure 4:
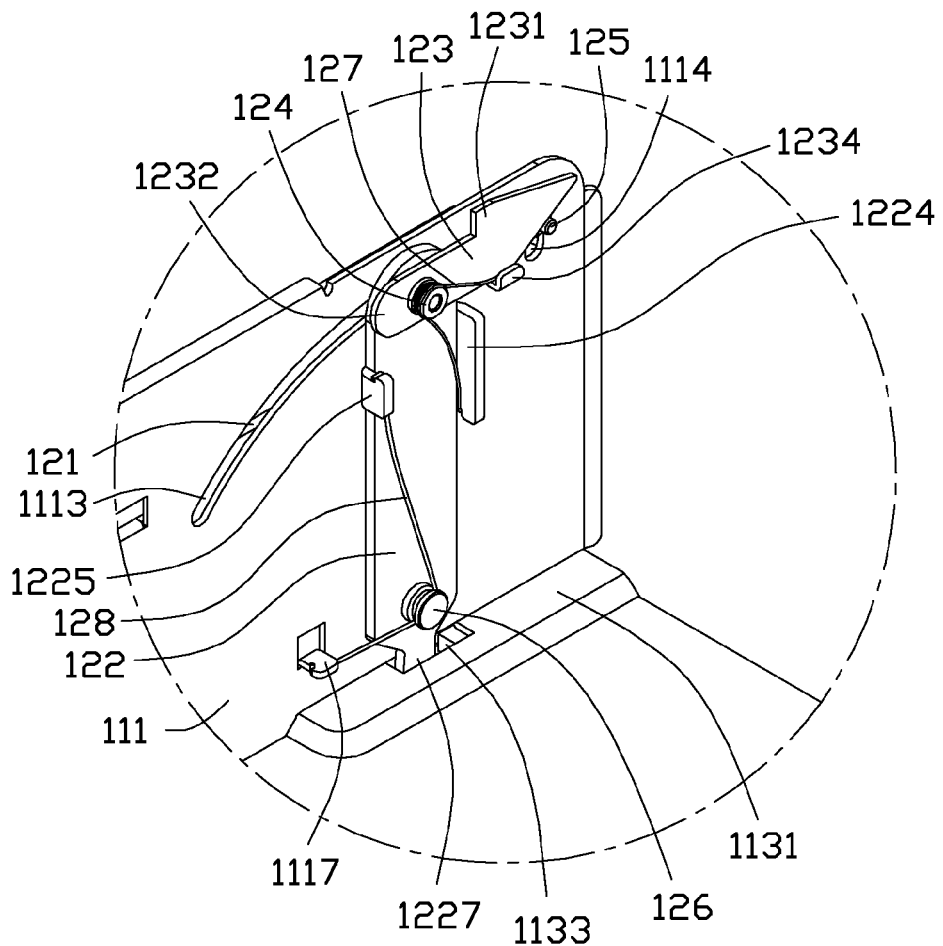
FIG. 4 is a schematic, enlarged view of a circled portion IV of the supporting device of FIG. 3.
Figure 5:
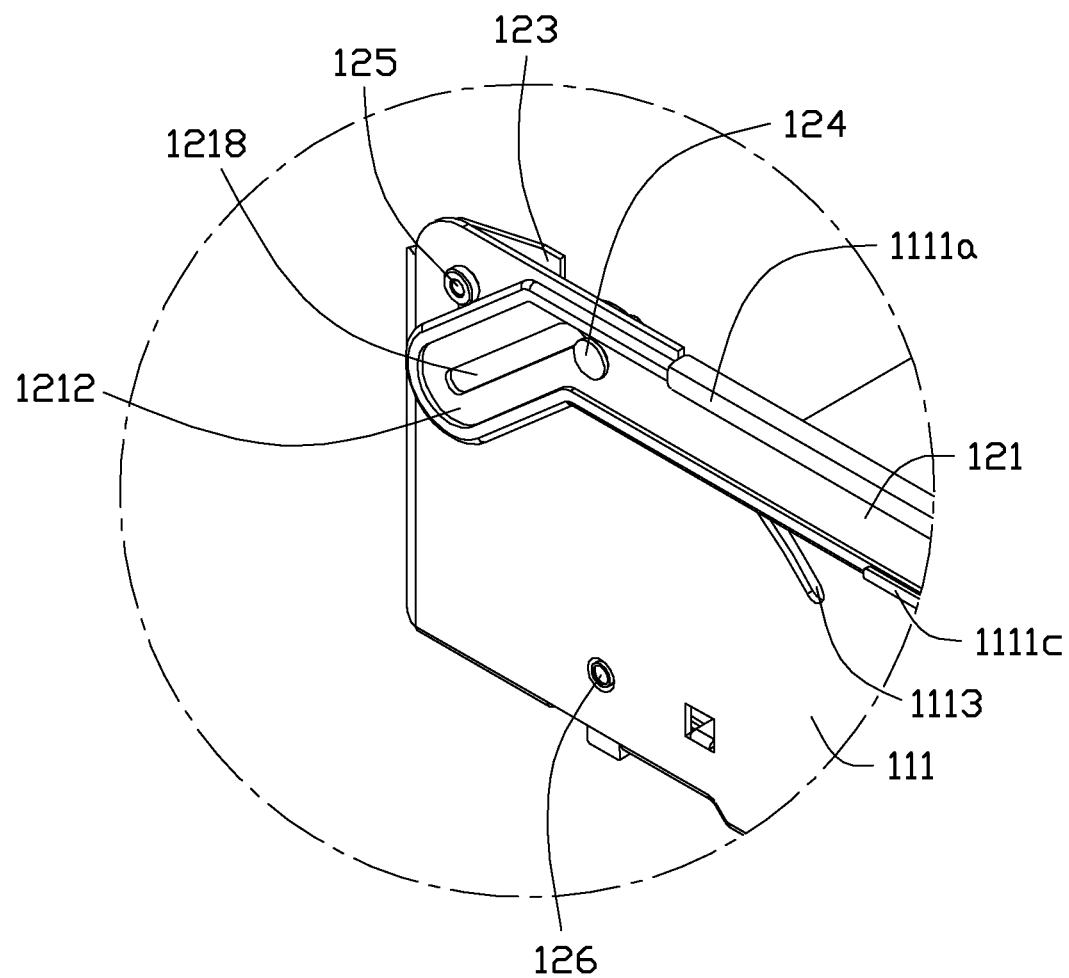
FIG. 5 is similar to FIG. 4, but viewed from another angle.
Figure 6:
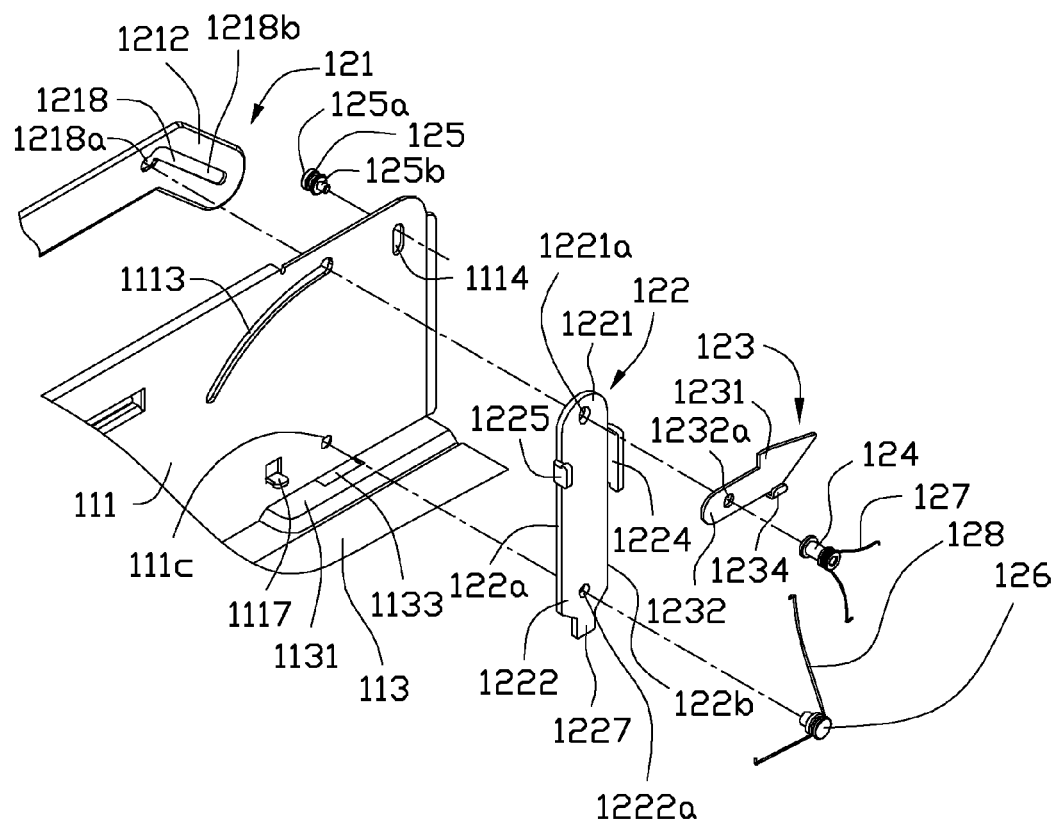
FIG. 6 is a schematic, exploded view of the supporting device of FIG. 1.

The first sidewall 111 is substantially rectangular, and has an inner surface 111a and an outer surface 111b opposite to the inner surface 111a. Referring to FIGS. 3, 4 and 6, the first sidewall 111 defines a curved first sliding slot 1113 and a straight second sliding slot 1114, both of which pass through the inner surface 111a and the outer surface 111b. The first sliding slot 1113 is adjacent to the rear wall 114 with respect to the second sliding slot 1114, and a circle described by the first sliding slot 1113 has a center point adjacent to the bottom wall 113 with respect to the second sliding slot 1114. The second sliding slot 1114 extends along the widthwise direction of the first sidewall 111. Referring to FIGS. 3 and 5, the outer surface 111b has a first sliding rail 1111a and a second sliding rail 1111b parallel to the first sliding rail 1111a. In this embodiment, the second sliding rail 1111b includes a number of strip-like blocks 1111c arranged along the lengthwise direction of the first sidewall 111.

Referring to FIGS. 4 & 6, the bottom wall 113 has two mounting plates 1131 on an end opposite to the rear plate 114. One of the two mounting plates 1131 is disposed on the junction of the bottom wall 113 and the first sidewall 111, the other one of the two mounting plates 1131 is disposed on the junction of the bottom wall 113 and the second sidewall 112. Each mounting plate 1131 defines a through groove 1133 passing through each mounting plate 1131 and the bottom wall 113. The through groove 1133 is aligned and communicates with the recess 217 of the housing 200. The through groove 1133 is aligned with one end of the first sliding slot 1113 adjacent to the second sliding slot 1114. The first sidewall 111 defines a fixing hole 111c adjacent to the bottom wall 113, and aligned with the through groove 1133.

Referring to FIGS. 2 and 4 to 6, the first locking device 12a includes a connecting pole 121, a swing pole 122, a buckle 123, a first bolt 124, a second bolt 125, a shaft 126, a first torsional spring 127, and a second torsional spring 128.

Referring to FIGS. 2, 3, and 5, the connecting pole 121 includes a main body 1210, a handle 1211, and an inclined portion 1212. The handle 1211 and the inclined portion 1212 are disposed on two opposite ends of the main body 1210. The main body 1210 is received between the first sliding rail 1111a and the second sliding rail 1111b. The handle 1211 is perpendicular to the main body 1210, and is bent towards the corresponding side plate 201. The handle 1211 extends out of the housing 200 and makes contact with an end surface 201a of the side plate 201. The handle 1211 defines a first screw hole 1215 passing through the handle 1211, the axis of the screw hole 1215 being parallel to the length direction of the handle 1211. The end surface 201a of each side plate 201 defines a second screw hole 201b aligned with the first screw hole 1215. A screw bolt 1216 extends through the first screw hole 1215 and the second screw hole 201b, so as to fix the handle 1210 on the housing 200.

Also referring to FIG. 6, the inclined portion 1212 inclines towards the bottom wall 113, and defines a third sliding slot 1218. The third sliding slot 1218 includes a straight first sliding portion 1218a and a straight second sliding portion 1218b extending from the first sliding portion 1218a, and communicating with the first sliding portion 1218a. The first sliding portion 1218a is positioned on an end of the main body 1210 adjacent to the inclined portion 1212 and extends along the extending direction of the main body 1210. The second sliding portion 1218b is positioned on the inclined portion 1212 and extends along the extending direction of the inclined portion 1212. The length of the inclined portion 1212 is greater than the shortest distance between the first sliding slot 1113 and the second sliding slot 1114.

The swing pole 122 is attached to the inner surface 111a of the first sidewall 111, and has a swing end 1221 and a hinge end 1222 opposite to the swing end 1221. The swing end 1221 defines a first through hole 1221a. The hinge end 1222 defines a second through hole 1222a, and has a protrusion 1227 capable of being received in the through groove 1133. The swing pole 122 further has a first edge 122a and a second edge 122b parallel to the first edge 122a. The first edge 122a and the second edge 122b are connected between the swing end 1221 and the hinge end 1222. A first fixing plate 1225 perpendicularly extends from the first edge 122a towards the second sidewall 112, a second fixing plate 1224 perpendicularly extends from the second edge 122b towards the second sidewall 112. The first fixing plate 1224 and the second fixing plate 1225 are adjacent to the swing end 1221, and are opposite to each other.

The buckle 123 has a triangular hook 1231 and a connecting portion 1232. The hook 1231 and the connecting portion 1232 form an L-shaped notch 1233. The connecting portion 1232 is attached to the swing end 1221, and defines a third through hole 1232a. A third fixing plate 1234 perpendicularly extends from one edge of the connecting portion 1232 adjacent to the bottom wall 113 towards the second sidewall 112. The length of the buckle 123 is greater than the shortest distance between the first sliding slot 1113 and the second sliding slot 1114.

The first bolt 124 extends through the third through hole 1232a, the second through hole 1221a, the first sliding slot 1113, and the third sliding slot 1218.

The second bolt 125 extends through the second sliding slot 1114, and can slide along the second sliding slot 1114. The second bolt 125 includes a first resisting portion 125a and a second resisting portion 125b opposite to the first resisting portion 125a. The first resisting portion 125a extends out of the outer surface 111b, the second resisting portion 125b extends in the receiving groove 116. The length of the first resisting portion 125a of the second bolt 125 is larger than or substantially equal to the thickness of the inclined portion 1212, and the length of the second resisting portion 125b is greater than or substantially equal to the thickness of the swing pole 122 and the buckle 123.

The shaft 126 extends through the second through hole 1222a and the fixing hole 111c. The radius of a circle described by the distal end of the first sliding slot 1218 is substantially equal to the distance between the first bolt 124 and the shaft 126.

The first torsional spring 127 sleeves on the first bolt 124, and two opposite ends of the first torsional spring 127 are respectively fixed on the first fixing plate 1224 and the third fixing plate 1234.

A fourth fixing plate 1117 extends perpendicularly from the inner surface 111a adjacent to the bottom wall 113. The second torsional spring 128 sleeves the shaft 126, and two opposite ends of the second torsional spring 128 are respectively fixed on the second fixing plate 1225 and the fourth fixing plate 1117.

Figure 7:
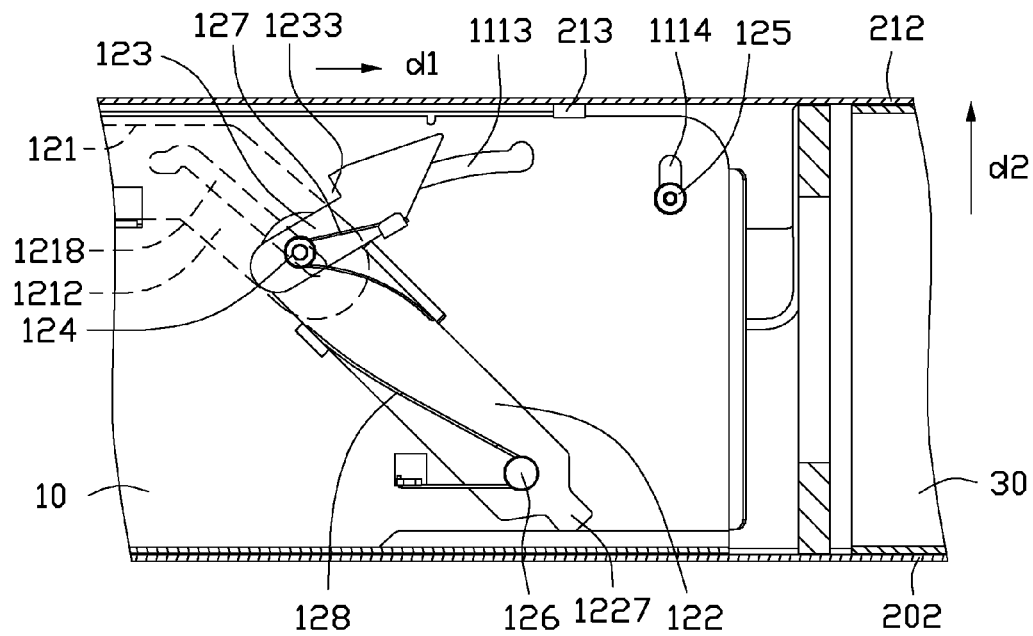
FIG. 7 is a schematic, cross-sectional view of the supporting device and the computer of FIG. 1, taken along a line VII-VII, showing the supporting device unlocked from the computer.
Figure 8:
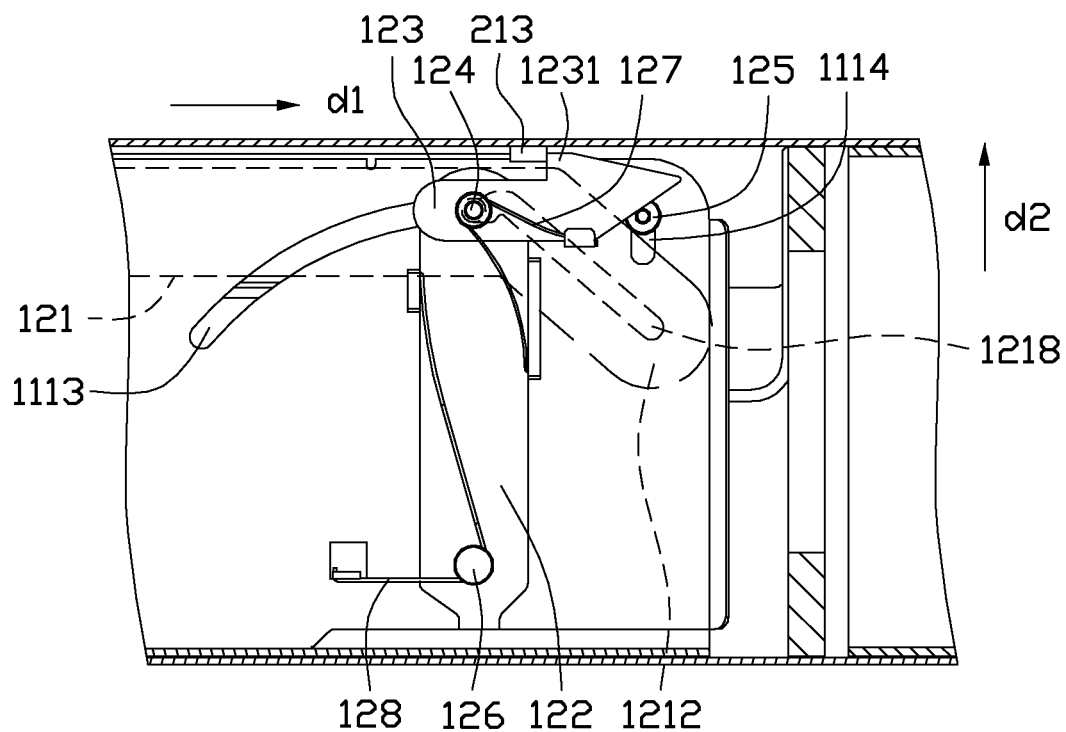
FIG. 8 is similar to FIG. 7, but showing the supporting device locked with the computer.

Referring to FIGS. 7 and 8, in use, when the connecting pole 121 is pushed, the connecting pole 121 slides along the first direction dl, the first bolt 124 firstly slides along the third sliding slot 1218, then slides along the first sliding slot 1113. At the same time, the first bolt 124 drives the swing pole 122 and the buckle 123 to slide along the third sliding slot 1218 and the first sliding slot 1113. When the first bolt 124 arrives at the end of the first sliding slot 1113 adjacent to the second sliding slot 1114, the protrusion 1227 inserts itself into the through groove 1133 and the recess 217, and the inclined portion 1212 and the hook 1231 resist on the first resisting portion 125a and the second resisting portion 125b respectively. If the connecting pole 121 is pushed further along the direction dl, the inclined portion 1212 pushes the second bolt 125 along the direction d2, the second bolt 125 pushes the hook 1231 along the direction d2, until the second bolt 125 arrives at an end of the second sliding slot 1114 adjacent to the top plate 212 of the housing 200. The notch 1233 resists on a surface of the locating block 213 away from the rear wall 114, and thus the first locking device 12a is locked together with the housing 200. At the last, the screw bolt 1216 extends through the first screw hole 1215 and the second screw hole 101b, and the first locking device 12a is thus securely fixed to the first sidewall 201. The working process of the second locking device 12b is same as the working process of the first locking device 12a, and the second locking device 12b is securely fixed to the second sidewall 202. By these means, the supporting device 10 is securely received in the computer 20.

When the supporting device 10 needs to be disassembled from the housing 200, the screw bolt 1216 is disassembled firstly, then the connecting pole 121 is pulled out of the housing 200, the first bolt 124 slides along the third sliding slot 1218, the first torsion spring 127 drives the buckle 123 to move towards the bottom wall 113, and thus, the second bolt 125 is driven to move along the second sliding slot 1114, the notch 1223 is separated from the corresponding locating block 213, then the second torsion spring 128 drives the swing pole 122 towards its original state, and the first bolt 124 slides along the first sliding slot 1113, the protrusion 1227 moves outwards from the through groove 1133 and the recess 217, then the connecting pole 121 can be pulled out to disassemble the supporting device 10 and the electronic element 30 from the housing 200.

The first torsion spring 127 and the second torsion spring 128 can drive the swing pole 122 and the buckle 123 towards their resting state, and thus the supporting device 10 can easily be pulled from the computer 30 which defines it as a significant laborsaving device. In other embodiments, the first torsion spring 127 and the second torsion spring 128 can be omitted.

By employing the supporting device 10, assembling the electronic element 30 to the housing 200 is by simply pushing the connecting pole 121, disassembly of the electronic element 30 from the housing 200 is achieved by simply pulling the connecting pole 121.

It will be understood that the above particular embodiments are shown and described by way of illustration only.

The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A supporting device for fixing an electronic element on a computer housing, the supporting device comprising:
   a loading device for loading the electronic element, the loading device comprising a rectangular first sidewall and a bottom wall connected to the first sidewall, the first sidewall having an outer surface and an inner surface, the first sidewall defining a curved first sliding slot, a straight second sliding slot extending along a width direction of the first sidewall, and a fixing hole adjacent to the bottom wall, wherein all of the first sliding slot, the second sliding slot, and the fixing hole pass through the outer surface and the inner surface; and
   a first locking device positioned on the first sidewall, the first locking device comprising:
      a connecting pole slidably positioned on the outer surface along a length direction of the first sidewall, and defining a third sliding slot;
      a swing pole attached on the inner surface of the first sidewall and having a swing end and a hinge end opposite to the swing end, the swing end defining a first through hole, the hinge end defining a second through hole;
      a buckle attached on the swing pole and defining a third through hole;
      a first bolt extending through the third through hole, the first through hole, the first sliding slot, and the third sliding slot;
      a second bolt extending through the second sliding slot, and having a first resisting portion and a second resisting portion opposite to the first resisting portion, the first resisting portion extending out of the outer surface, the second resisting portion extending in the loading device; and
      a shaft extending through the second through hole and the fixing hole;
      wherein when the connecting pole is pushed, the connecting pole drives the first bolt to slide along the first sliding slot until the buckle resists against the upper portion of the second resisting portion, the connecting pole resists against lower portion of the first resisting portion, then the connecting pole drives the second bolt to slide along the second sliding slot in a direction away from the bottom wall, the second bolt pushes the buckle to move until the buckle is coupled with the computer housing, and thus the supporting device is locked with the computer housing.

2. The supporting device of claim 1, wherein the connecting pole comprises an inclined portion, the inclined portion defines the third sliding slot, a length of the first resisting portion is larger than or substantially equal to a thickness of the inclined portion, a length of the second resisting portion is greater than or substantially equal to a thickness of the swing pole and the buckle.

3. The supporting device of claim 1, wherein the radius of a circle described by a distal end of the first sliding slot is substantially equal to a distance between the second bolt and the shaft.

4. The supporting device of claim 1, wherein a length of the buckle is greater than the shortest distance between the first sliding slot and the second sliding slot.

5. The supporting device of claim 1, wherein the connecting pole comprises a main body, and an inclined portion extending from the main body, the inclined portion is inclined with respect to the main body and defines the third sliding slot.

6. The supporting device of claim 5, wherein a length of the inclined portion is greater than a shortest distance between the first sliding slot and the second sliding slot.

7. The supporting device of claim 5, wherein the third sliding slot comprises a straight first sliding portion and a straight second sliding portion communicated with the first sliding portion, the first sliding portion is positioned on an end of the main body adjacent to the inclined portion and extends along the extending direction of the main body, the second sliding portion is positioned on the inclined portion and extends along the extending direction of the inclined portion.

8. The supporting device of claim 5, wherein the connecting pole further comprises a handle, the handle and the inclined portion are positioned on two opposite ends of the main body, the handle is configured to being screwed to the computer housing.

9. The supporting device of claim 8, wherein the handle defines a screw hole.

10. The supporting device of claim 1, wherein the buckle comprises a connecting portion and a hook extending from the connecting portion, the buckle defines a notch between the hook and the connecting portion, the notch is configured for engaging with the computer housing, and the hook is configured for resisting against the second resisting portion.

11. The supporting device of claim 10, wherein the hook is triangular shaped.

12. The supporting device of claim 1, wherein the supporting device further comprises a first torsional spring, the first torsional spring is sleeved over the first bolt, two opposite ends of the first torsional spring are fixed to the swing pole and the buckle respectively.

13. The supporting device of claim 12, wherein the supporting device further comprises a second torsional spring, the second torsional spring is sleeved over the shaft, two opposite ends of the second torsional spring are fixed to the swing pole and the first sidewall respectively.

14. The supporting device of claim 13, wherein the swing pole has two parallel edges, a first fixing portion and a second fixing portion, the first fixing portion and the second fixing portion extend from the two parallel edges in directions away from the first sidewall respectively, the buckle has a third fixing portion on an edge adjacent to the bottom wall, the first sidewall comprises a fourth fixing portion, the two opposite ends of the first torsional spring are fixed on the first fixing portion and the third fixing portion, the two opposite ends of the second torsional spring are fixed on the second fixing portion and the fourth fixing portion.

15. The supporting device of claim 1, wherein the computer housing comprises a top plate and a bottom plate opposite to the top plate, the top plate comprises a locating block facing the bottom plate, the locating block is configured for engaging with the buckle to lock the supporting device on the computer housing.

16. The supporting device of claim 15, wherein the bottom plate defines a recess, the bottom wall defines a through groove aligned with the recess and one end of the first sliding slot adjacent to the second sliding slot, the hinge end comprises a protrusion, the protrusion inserts into the through groove and the recess when the supporting device is locked on the computer housing.

17. The supporting device of claim 16, wherein the loading device further comprises a rear wall perpendicularly connected between the first sidewall and the bottom wall, the first sliding slot is adjacent to the rear plate with respect to the second sliding slot, a circle described by the first sliding slot has a center point adjacent to the bottom wall with respect to the second sliding slot.

18. The supporting device of claim 1, wherein the outer surface of the first sidewall positions a stripe-shaped first sliding rail extending along the length direction of the first sidewall and a second sliding rail parallel to the first sliding rail, the connecting pole is received between the first sliding rail and the second sliding rail.

19. The supporting device of claim 18, wherein the second sliding rail comprises a plurality of stripe-shaped blocks arranged along the length direction of the first sidewall.

20. The supporting device of claim 1, wherein the loading device further comprises a second sidewall parallel to the first sidewall, the supporting device further comprises a second locking device positioned on the second sidewall, the configuration of the second locking device is the same as the configuration of the first locking device.

* * * * *